Figure 3:
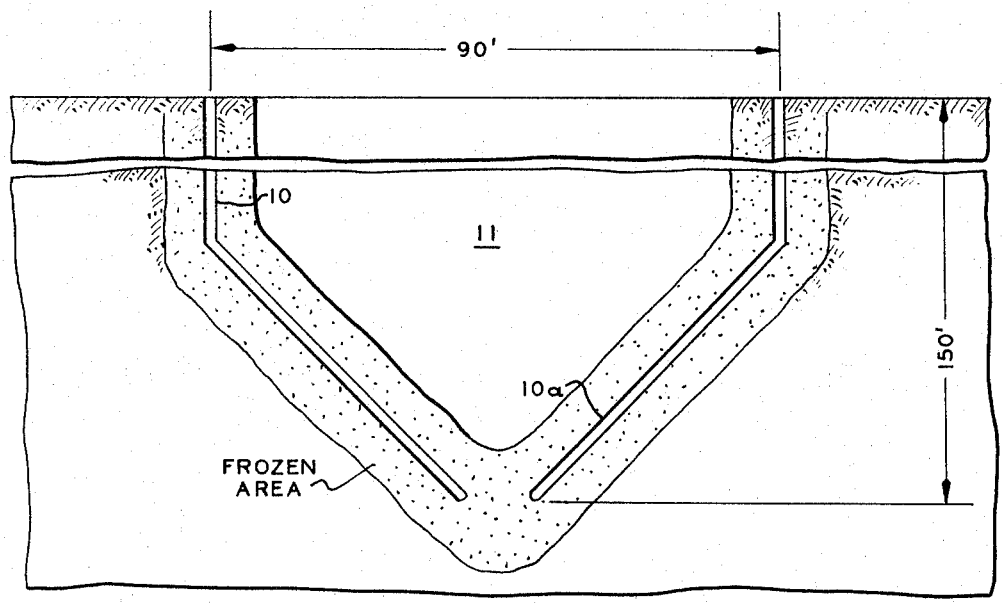

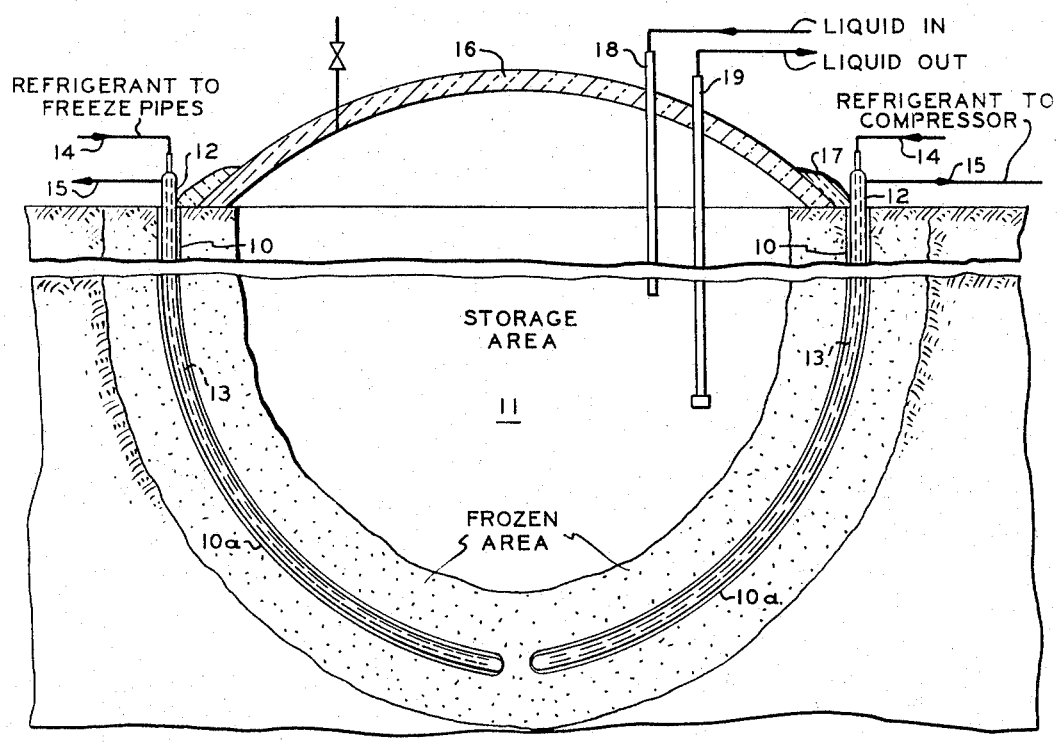
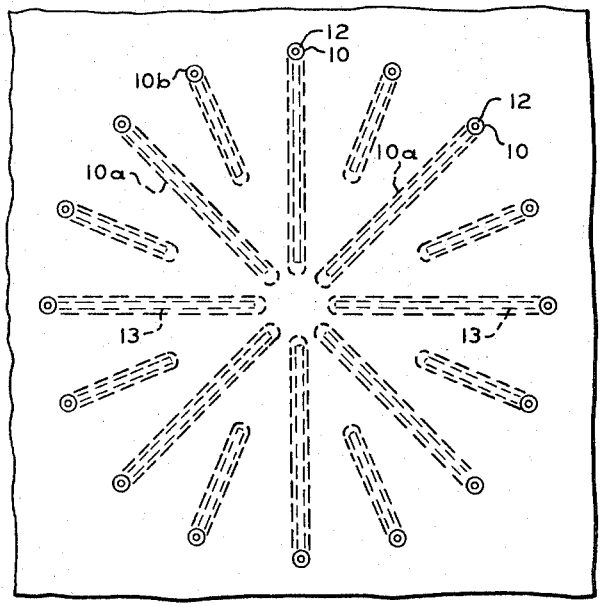

United States Patent Office 3,295,328
Patented Jan. 3, 1967

3,295,328
RESERVOIR FOR STORAGE OF VOLATILE LIQUIDS AND METHOD OF FORMING THE SAME
George F. L. Bishop, Woods Cross, Utah, assignor to Phillips Petroleum Company, a corporation of Delaware
Filed Dec. 5, 1963, Ser. No. 328,215
7 Claims. (Cl. 61—.5)

This invention relates to storage of volatile liquids. In one aspect it relates to a method for preparing a reservoir for the storage of volatile liquids in the surface of the earth wherein the earthen formations are water permeable and water saturated. In another aspect it relates to an earthen reservoir in the earth's surface wherein the earthen formations around and below the reservoir are water permeable and water saturated.

The petroleum industry produces great quantities of volatile liquid hydrocarbons as a result of processing crude oil and natural gas. Volatile liquids such as propane and butane require enormous storage facilities particularly during periods of slack use. Increased seasonal demand for such products places increased strain on these facilities. Great quantities of volatile liquids including propane and butane have been, and are being, stored in underground caverns mined or dissolved from impervious formations. Such reservoirs, however, are limited to certain formations which are not always available at the desired location; are expensive to prepare; and present serious problems of providing adequate vapor seals. More recently, open-topped earthen reservoirs have been formed by a ring of freeze pipes sunk vertically into the soil about the area to be excavated, circulating a refrigerant through these pipes until a ring of frozen earth results and then excavating a cavity inside the ring of frozen earth. Such reservoirs, however, are also limited to earthen formations which are underlain with water-impermeable clay or shale so as to provide a plug sealing off the bottom of the frozen earth barrier ring.

According to the present invention the earthen formation adjacent the bottom of the reservoir site is frozen as well as a ring of earthen formation about the periphery of the reservoir site so that the area of frozen earth comprises an open-topped vessel or cup. The method for forming the open-topped shell of frozen earth comprises sinking a plurality of boreholes about the periphery of the proposed reservoir site vertically into the earth for a predetermined distance and then inwardly toward a locus below the center of the proposed reservoir site. The boreholes are spaced apart an earth-freezing distance, i.e., a distance such that the earth between the boreholes will be frozen by circulation of a refrigerant in freeze pipes placed in the boreholes. The boreholes are drilled vertically to form a substantial portion of the wall section of the reservoir and are then deviated inwardly toward the center of the proposed reservoir site to form the bottom of the frozen shell forming the reservoir. Deviation of the boreholes from vertical is accomplished by known directional drilling methods including directional jet drilling or directional drilling by means of whipstocks or knuckle joints. Directional drilling can also be accomplished by the slant hole drilling technique which comprises tilting the turntable of the rotary drilling rig so that the drill bit and drill pipe penetrate the earth at an angle rather than vertically. Jet drilling techniques are preferred because this method enables the driller to deviate the borehole from vertical substantially continuously so that the borehole can assume a smooth and gradual curve toward a locus below the center of the proposed reservoir.

Figure 4:
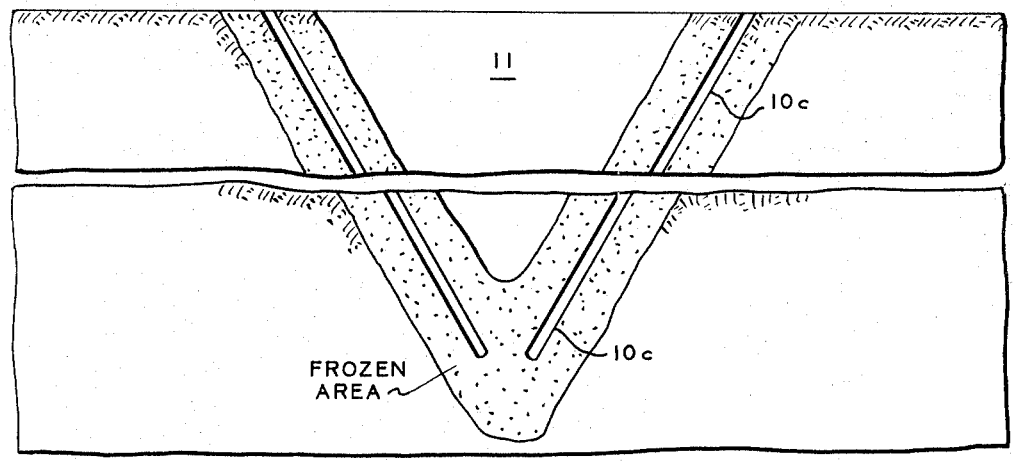

It is an object of this invention to provide a method for forming a frozen earth reservoir in earthen formations which are water permeable and water saturated to a depth greater than that of the proposed reservoir site. It is also an object of this invention to provide an open-topped reservoir in the earth's surface comprising a shell of frozen earth surrounded on its sides and bottom with water-permeable and water-saturated earthen formations. Other objects and advantages will be apparent to those skilled in the art upon study of this disclosure including the detailed description of the invention and the appended drawing wherein:

FIGURE 1 is a sectional view in elevation of a storage reservoir according to the invention;
FIGURE 2 is a grade level plan view of the reservoir of FIGURE 1;
FIGURE 3 illustrates a modification of the reservoir of FIGURE 1; and
FIGURE 4 illustrates another modification of the reservoir of FIGURE 1.

Referring now to the drawing, and particularly to FIGURE 1, a series of boreholes 10 is drilled around the periphery of the site of the proposed reservoir 11. The boreholes are drilled vertically to near the bottom of the proposed reservoir and then are drilled directionally to within earth-freezing distance of the center of the reservoir as indicated by 10a. As a result of convergence of the boreholes toward a single point below the center of the reservoir, some of the boreholes will be drilled to a lesser depth as indicated at 10b in FIGURE 2. Also, the lower ends of the boreholes 10 do not necessarily have to be in the same horizontal plane, but can be at different levels, their lower ends being no greater than a freezing distance apart.

Freeze pipes 12 are installed in the boreholes 10 and refrigerant pipes 13 are installed in the freeze pipes 12. The freeze pipes 12 are closed at the bottom and the refrigerant pipes 13 are open at the bottom and terminate short of the bottom of the freeze pipes 12 so that refrigerant can be pumped down the pipes 13 and can vaporize and expand and rise in the annulus between pipes 12 and 13. The refrigerant is supplied to pipes 13 via conduits 14, and refrigerant vapors are removed from freeze pipes 12 via conduits 15 and passed to a refrigeration system compressor and condenser system (not shown).

After the earth is frozen around the boreholes for a distance such that the earth between the boreholes is frozen solid, the unfrozen earth within the frozen shell is excavated and an insulated roof 16 is positioned over the open reservoir 11 and sealed to the earth around the periphery of the cavity. The roof can be sealed to the earth by means of a bank of mud 17 frozen solid around the edge of the roof. The roof is thus frozen to the earth and is anchored as well as sealed to the earth. Liquid inlet conduit 18 and liquid outlet ocnduit 19 serves to introduce liquid to, and withdraw liquid from the reservoir.

The boreholes 10 of FIGURE 1 can be drilled directionally by means of jet directional drilling techniques. A method for jet directional drilling is described in U.S. Patent 2,873,092 (1959). This type of directional drilling is particularly applicable to the present invention wherein it is desired to form a frozen earth reservoir in earthen formation that are water permeable and water saturated for a depth greater than it is desirable or practical to freeze the formation. Such water-saturated formations are usually unconsolidated or are soft sandstone and are therefore readily penetrated by the fluid jet. This type of directional drilling will also produce a gradual and substantially continuous change of direction so that the borehole can be drilled substantially vertically for a considerable distance and then be caused to deviate toward the center of the reservoir site. This is a definite advantage because it provides a reservoir of maximum volume with minimum surface opening.

In one specific embodiment of the invention a reservoir 80 feet in diameter and about 85 feet in depth is formed with freeze pipes which will freeze a circle having a radius of about 5 feet in the time allotted. The boreholes will be spaced apart 10 feet about a circle having a diameter of 90 feet. Alternate boreholes 10 will be drilled to a total depth of about 90 feet. The alternate boreholes 10b will be drilled to a total depth of about 75 feet. The first 30 feet of each borehole will be drilled vertically and the remainder of the hole will be deviated toward the center of the reservoir site in the approximate form of an arc of a circle having a radius of 65 feet. This will require that the boreholes be deviated from vertical about 0.8 foot at a depth of 40 feet; about 3.2 feet at a depth of 50 feet; about 7.0 feet at a depth of 60 feet; about 13.8 feet at a depth of 70 feet; about 23.0 feet at a depth of 80 feet; and about 40.0 feet at a depth of 90 feet.

The boreholes are drilled with a 4-inch jet type drill bit with a conventional orientation device mounted immediately above the drill bit. The freeze pipes are 3-inch standard steel pipe with a bull plug in the bottom end. The refrigerant pipes are 1-inch standard steel pipe, open ended at the bottom with the open end spaced a short distance above the bottom of the freeze pipe. The refrigerant pipe can also be closed at the bottom with perforations about the periphery of the pipe near the bottom. The refrigerant will exit the refrigerant pipe about 1 or 2 feet above the bottom of the freeze pipe.

The earth will be frozen between the freeze pipes in about 4 to 6 weeks when liquid propane is utilized as refrigerant. Thus excavation can be started in about 4 weeks after the refrigeration is started. If water flows into the cavity during the excavation, the excavating should be halted until additional freezing of the earth stops the flow of water. The frozen cavity walls are protected by a layer of insulation as the excavation proceeds, particularly if the excavation is done during warm or windy weather.

When the excavation is completed, the insulated roof is placed over the cavity and sealed to the frozen earth by placing a bank of mud about the edge of the roof on the frozen earth so the mud freezes to form a seal and an anchor. Inlet and outlet conduits are installed and the reservoir is ready to receive liquid for storage, e.g., liquid propane. The low temperature is maintained by removing, compressing and condensing the vapor from the reservoir and returning the liquid to the reservoir in the conventional manner.

A reservoir as shown in FIGURE 3 is formed in the manner described with respect to FIGURES 1 and 2 with the exception that the deviation of the boreholes 10 from vertical is accomplished by the use of whipstocks or knuckle joints according to conventional practices of directional drilling.

The reservoir of FIGURE 4 is also formed by techniques similar to that used in forming the reservoir of FIGURE 1 except that the boreholes 10c about the periphery of the reservoir site are drilled by tilting the turntable of the rotary rig at the commencement of the drilling of each borehole so that the boreholes converge toward a point below the center of the reservoir site. While this method offers the advantage of inserting the freeze pipe into a straight hole rather than a curved hole, it is offset by the disadvantage that the ratio of the area of the open top to the volume of the cavity is greatly increased because the shell of frozen earth is in the form of an inverted cone instead of a cylinder having a rounded bottom.

In certain instances it may be desirable to use a combination of two or more of the methods illustrated in FIGURES 1, 3 and 4.

Variations and modifications are possible within the scope of the present disclosure without departing from the spirit and scope of the invention.

That which is claimed is:

1. The method of forming a reservoir in the earth's surface which comprises drilling a plurality of boreholes spaced within earth freezing distance of each other about the periphery of the reservoir site downwardly into the earth and directionally toward the center of the reservoir site so that the boreholes terminate within earth freezing distance of the center of the bottom of the proposed reservoir;

circulating refrigerant in said boreholes to freeze the earth surrounding said boreholes, thereby to form a shell of frozen earth around and under the site of the proposed reservoir; and excavating the unfrozen earth within the shell of frozen earth.

2. The method of claim 1 wherein a whipstock is utilized to drill the boreholes directionally.

3. The method of claim 1 wherein a knuckle joint is utilized to drill the boreholes directionally.

4. The method of claim 1 wherein a directional jet drill is utilized to drill the boreholes directionally.

5. The method of claim 1 wherein the drill is slanted toward the center of the proposed reservoir.

6. The method of forming a reservoir in the earth's surface which comprises drilling a plurality of boreholes in the earth's surface about the periphery of the reservoir site at earth freezing distance from the proposed wall of the reservoir; said boreholes being spaced within an earth freezing distance of each other;

said boreholes being drilled downwardly into the earth and directionally toward the center of the reservoir site so that said boreholes terminate within earth freezing distance of the center of the bottom of the proposed reservoir;

introducing refrigerant into said boreholes so as to freeze the earth surrounding said boreholes;

excavating the earth within the area of frozen earth; and covering said reservoir with an impermeable roof.

7. An earthen reservoir for storage of a volatile liquid at about its boiling temperature comprising an open-topped cavity in frozen earth; a pluality of freeze pipes positioned adjacent the periphery of said reservoir within earth freezing distance of each other, extending from the surface downwardly and gradually inwardly into the earth toward the center of the reservoir to a locus within earth freezing distance of said center; means to supply refrigerant to said freeze pipes; an insulated roof covering said reservoir; and means to add volatile liquid to and withdraw volatile liquid from said reservoir.

References Cited by the Examiner

UNITED STATES PATENTS

| | | | |
|---|---|---|---|
| 755,956 | 3/1904 | Sooysmith | 61—36.1 |
| 786,382 | 4/1905 | Reno | 61—36.1 |
| 2,961,840 | 11/1960 | Goldtrap | 61—.5 X |
| 3,159,006 | 12/1964 | Sliepcevich | 65—.5 |

FOREIGN PATENTS 111,569  3/1962  Pakistan.

EARL J. WITMER, *Primary Examiner.*